June 25, 1935.　　　J. L. BAIRD　　　2,006,124

TELEVISION APPARATUS

Original Filed Dec. 31, 1926

INVENTOR
By John L. Baird
Watson, Coit, Morse & Grindle
ATTYS

Patented June 25, 1935

2,006,124

UNITED STATES PATENT OFFICE 2,006,124

TELEVISION APPARATUS

John Logie Baird, London, England, assignor to Television Limited, London, England, a British company Application December 31, 1926, Serial No. 158,345
Renewed April 4, 1929. In Great Britain January 20, 1926

5 Claims. (Cl. 178—6)

This invention relates to the transmission of views, scenes or images to a distance, commonly known as television, and has for its object to provide an improved method of operation and an improved apparatus for this purpose.

This invention is applied to apparatus of the type wherein an image of the object is explored by a light-sensitive cell, and it is desirable for satisfactory transmission and reproduction that the illumination of the object or scene should be very intense. Such intense illumination, however, introduces other difficulties, such for example as risk of burning, and one object of this invention is to provide a means and method of illumination whereby such difficulties are avoided.

This invention accordingly comprises in a television or like system wherein an image of the object is explored by a light-sensitive cell or cells, the method of illuminating the object consisting in traversing over it a point of light in such manner that when any particular area of the object is projected on to the light-sensitive cell, such area is momentarily illuminated by the point of light.

Preferably the traversal aforesaid of the point of light is such that the area illuminated at any instant is the area which at that instant is projected on to the light-sensitive cell.

With this method of illumination a very high intensity may be safely used, since the point of light can be traversed at a rate such that no objectionable effects are produced on the object, and the average intensity of illumination of the object is of course low.

This invention also comprises in television and like apparatus, the combination with means for exploring the object by a light-sensitive cell, of means for illuminating the object by a point of light which traverses the object in synchronism with the exploration thereof.

According to another feature of this invention the exploring device is itself used to traverse a point of light over the object whereof an image is to be transmitted.

When the television or like apparatus comprises an exploring device constituted by a rotating member carrying a plurality of optical projecting devices, such as lenses or mirrors, there is provided, according to this invention, the combination with such exploring device, of a source of light which is shielded from the light-sensitive cell and is arranged to project a point of light on to the object by means of the said optical projection devices, or by means of an additional plurality of optical projection devices carried on the rotating member.

In a modified construction according to this invention, there is provided in television and like apparatus as above set forth, means for traversing the point of light over the object, comprising a prism or prisms through which a beam is projected on to the object, and means for varying the refraction of the beam by the said prism or prisms. The variations may be obtained by moving the prisms mechanically, or alternatively, the prism or prisms may be constituted by a vessel or vessels containing nitro-benzene or like material with means for subjecting them to electrostatic or electromagnetic stress to vary the refractive index.

According to yet another feature of this invention the apparatus for traversing the point of light over the object may comprise a moving system of optical projection devices for moving the point of light in one direction across the object, and a prism as aforesaid for moving it in another direction, for example at right-angles to the first direction.

The accompanying drawing, Figures 1 to 3, indicate purely diagrammatically various features of the present invention, in which.

Figure 1:
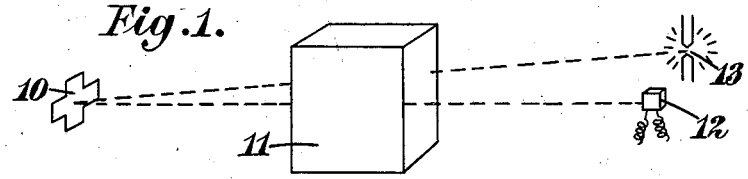
Figure 1 is a diagrammatic view illustrating the general arrangement of the parts, the exploring device being indicated generally at 11.

Referring first to Figure 1, an object whereof an image is to be transmitted, is indicated at 10, and 11 represents diagrammatically an exploring device whereby an image of the object 10 is traversed over a light-sensitive cell indicated by 12.

A source of light 13, suitably shielded from the light-sensitive cell 12, is arranged to project a beam of light onto the object 10, so that a point of light is traversed across the object 10 in synchronism with the exploration of the object by the cell 12. The arrangement is such that when any particular small area of the object 10 is projected on to the cell 12, the point of light from the source 13 is simultaneously projected on to that area so that any desired degree of intense illumination may be provided on the object for the purpose of actuating the cell 12, but the point of intense illumination is traversed over the object so that no deleterious effects arise from it.

It will be appreciated that the point of light could, if desired, be traversed over the object at a rate different from the rate at which exploration by the cell takes place, it only being necessary that when a particular area or point on the object is projected on the cell, it should be subjected momentarily to the desired degree of illumination. Obviously, this method of illumination could be used in conjunction with a plurality of light-sensitive cells or even with a system in which a large number of cells are used to cover the whole area of an image of the object; in this case, a low intensity of illumination, such as would not materially affect the cells, could be used permanently on the object, and the desired intensity of illumination for transmission purposes is projected on to the object in the manner hereinbefore described.

Figure 2:
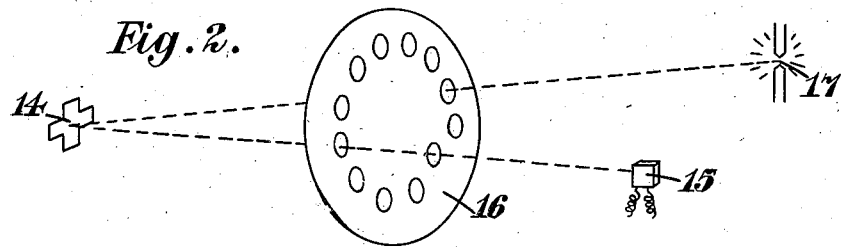
Figure 2 is a similar view in which a rotatable disk is employed.

Figure 2 illustrates diagrammatically, a form of exploring device such as is described in British patent specification No. 230,576, used in connection with the present invention. In this case the object is indicated at 14, the light-sensitive cell at 15 and the exploring device at 16, this device comprising a rotating member, illustrated as a disc, on which is mounted a series of lenses arranged in a spiral. The disc is rotated and each lens projects an image of the object and causes it to traverse the cell 15. The source of light 17 is arranged to project a beam of light through a lens on the opposite side of the disc from the lens which is projecting the image on to the cell 14, so that the point of light on the object traverses the object synchronously with the traversal of the image over the cell 15.

Figure 3:
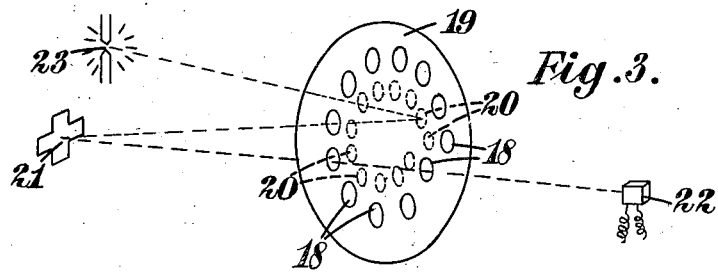
Figure 3 shows a modified form of the rotatable disk.

It is not essential that the same lenses or mirrors should be used for both purposes, for any desired combination of optical projecting devices may be used, such for example as illustrated in Figure 3, where a series of lenses 18 are mounted on a rotating member 19, together with a similar series of mirrors 20. The lenses 18 are used to project the image of the object 21 on the light-sensitive cell 22, and the mirrors are used to reflect the beam of light from the source 23 on to the object and to traverse it thereover.

I claim:—

1. In an electro-optical system, the combination with a source of light, of a light-sensitive cell, a rotatable disc, a series of spirally disposed optical devices mounted thereon and arranged to traverse a beam of light from the source over an object, and a second series of spirally disposed optical devices mounted on said disc for synchronously scanning the object by said light-sensitive cell.

2. In an electro-optical system, the combination with a source of light, of a light-sensitive cell, a rotatable disc interposed between said source and cell, and provided with a series of spirally arranged apertures, a series of spirally arranged reflectors carried by said disc and adapted to traverse a beam of light from said source over an object, said apertures being so arranged as to synchronously project the illuminated object area on said cell.

3. In an electro-optical system, the combination with a source of light, of a light-sensitive cell, a rotatable disc interposed between said source and cell, a series of spirally arranged reflectors mounted on said disc and adapted to traverse a beam of light from said source over an object, and a series of spirally arranged lenses mounted on said disc for synchronously scanning said object by the light sensitive cell.

4. A scanning system comprising a rotating scanning device having large aperture therein, means for projecting a scanning beam through one aperture of said device onto an object to be scanned, the light reflected from said object passing through another aperture on said disk on the opposite edge thereof, and means for projecting the rays passing through said other aperture onto a light sensitive device.

5. A television method which comprises scanning an object with a spot of light projected through one aperture in a scanning disc, and scanning a light responsive element through another aperture in said scanning disc with light reflected from said object.

JOHN LOGIE BAIRD.